Oct. 30, 1923.
H. C. FORD
CALCULATING INSTRUMENT
Filed June 15, 1918
1,472,590
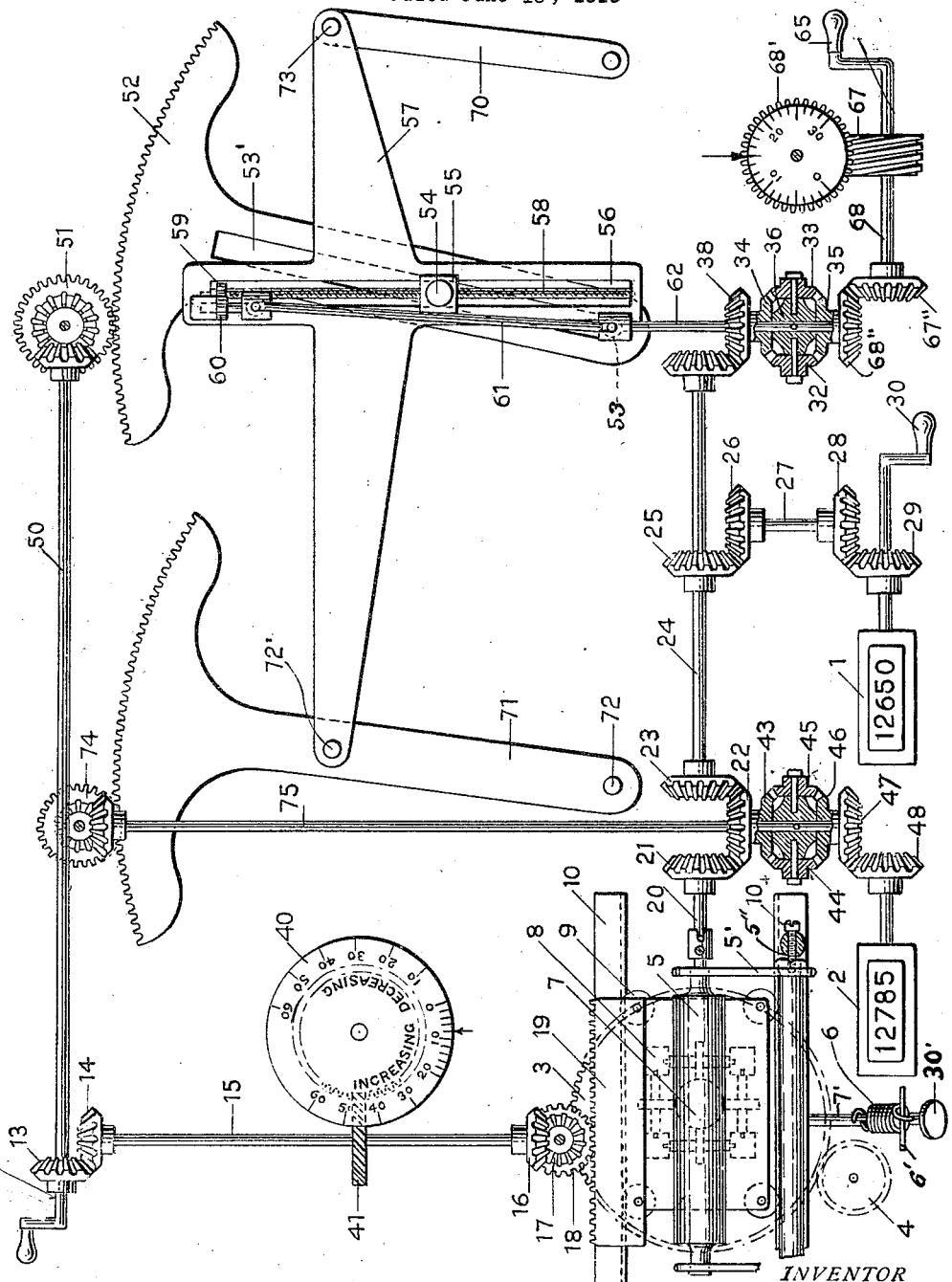
INVENTOR
Hannibal C. Ford
BY Henry Mrakley
ATTORNEY Patented Oct. 30, 1923.

1,472,590

UNITED STATES PATENT OFFICE.

HANNIBAL C. FORD, OF JAMAICA, NEW YORK, ASSIGNOR TO FORD INSTRUMENT COMPANY, INC., OF NEW YORK, N. Y., A CORPORATION OF NEW YORK.

CALCULATING INSTRUMENT.

Application filed June 15, 1918. Serial No. 240,217.

*To all whom it may concern:*

Be it known that I, HANNIBAL C. FORD, a citizen of the United States, residing at Jamaica, in the borough of Queens, State of New York, have invented new and useful Improvements in Calculating Instruments, of which the following is a specification.

This invention relates to calculating machines and has for its general object the provision of an instrument for determining the value of one variable for a given value of a second variable when the rate existing between the two variables is known.

One embodiment of the invention may be utilized to predict the change in range between a gun and a target during a given time interval when the range rate is a known factor. As is well known, when a gun and its target are moving relatively to each other, the range at the instant the shell or projectile reaches the target, is materially different from the range at the instant the gun is sighted, due to the movement of the gun and target during the elapsing time interval. The length of the time interval depends upon the time of flight of the projectile and also upon the transmission interval, or the time which elapses from the receipt of a range at the gun until the gun is fired.

The invention contemplates the provision of a means for automatically determining the amount which the range changes during this time interval and for adding or subtracting this amount from the range at any given instant of time to thereby obtain the predicted range for which the gun should be sighted in order to have its projectile reach the target.

In the preferred form the invention consists of a range indicator which may be initially set to the range between the gun and the target, a range clock consisting of a variable speed mechanism upon which the range rate is set up for continuously actuating this range indicator to continuously indicate the present range and a predictor which actuates the indicator to change its reading by the amount which the range will vary during a predetermined time interval.

In the drawing, the figure represents somewhat diagrammatically, an instrument constructed in accordance with the principles of the invention.

In the drawing, two rotary range counters of the usual construction are shown, one of which is indicated 1 and the other 2. The present range counter 1 gives readings of the range at any instant of time. The range counter 2 indicates the advance or predicted ranges and will be either greater or less than the present range, depending upon whether the range between the gun and the target is increasing or decreasing.

Referring first to the mechanism for actuating the present range counter 1, this mechanism is of a construction which is generally known as a range-clock and consists primarily of a variable speed device upon which the range rate is set up. In the present construction this variable speed device is shown as consisting of a disc 3 which is adapted to be rotated at a constant speed by means of a gear 4, which is adapted to be connected to a constant speed motor (not shown). Arranged above the driving disk is a driven roller 5 which is mounted between the arms of a yoke 5′ pivoted at 5″ to suitable supports. The yoke 5′ is pressed toward the disk by a spring 6 connected at one end to a fixed rod 6′ and at the other end to an arm 7′ attached to the yoke 5′ and provided with a knob 30′. Intermediate the disc and roller is a pair of balls 7, only one of which is shown. The balls are surrounded by a cage 8, which is provided with rollers 9 sliding in guideways 10. The supports for the yoke 5′ may be in the form of posts attached to the top of one of the guideways. This variable speed mechanism is of the same construction as the one disclosed in my application for patent on a range keeper filed December 4th, 1917, and identified by Serial Number 205,357, now Patent #1,370,204.

The position of the balls 7 upon the disc and hence the speed of the roller 5, is dependent upon the range rate which is set up by the handle 12. The handle actuates the cage 8 through bevel gears 13 and 14, shaft 15 and gears 16, 17 and 18, the gear 18 meshing with a rack 19 which is carried by the cage 8. When the range rate is zero, the balls are positioned at the center of the disc and there is no rotation of the roller 5. For an increasing range rate the balls are moved to one side of the center of the disc, an amount proportional to rate. For a decreasing range rate the balls are moved to the other side of the center of the disc in the same manner. The balls will therefore drive the roller in a direction corresponding to an increasing or decreasing range and at a speed proportional to the changes in range. The roller 5 therefore may be utilized to drive the range counter or indicator 1 to continuously indicate the present range if the initial range has been correctly set up on the counter. The present range counter 1 is driven from the roller 5 through a shaft 20, bevel gears 21, 22, 23, shaft 24, bevel gears 25 and 26, shaft 27 and bevel gears 28 and 29.

The initial range is set up upon the present range counter 1 by means of a handle 30 which will also drive the roller 5. Before turning the crank 30, the rod 7' should be depressed to stretch the spring 6 and swing the yoke 5' to lift the roller 5 from the ball 7 to permit it to turn freely.

If desired, the range rate may be indicated upon a range rate dial 40 which is actuated by a worm or spiral gear 41 upon the shaft 15.

Referring now to the prediction device, the connections between the present range counter 1 and the advance range counter 2 may first be considered. As has been described, the shaft 24 is actuated when the range counter 1 is turned by the handle 30 or by the roller 5 of the variable speed mechanism. This shaft 24 through the bevel gears 21, 22 and 23 also actuates the advance range counter 2, since the gear 22 is connected to a gear 43 forming a part of a differential, the other gears of which are 44, 45 and 46. The gears 44 and 45 constitute the center of the differential and are carried by a spider as is the usual construction. When, therefore, the shaft 24 is actuated, the gear 43, if the center of the differential is stationary, will rotate the gear 46 and through the bevel gears 47 and 48 actuate the advance range counter in extct synchronism with the present range counter 1.

The prediction is added to the advance range counter 2 through the differential consisting of gears 43, 44, 45 and 46 and will now be described. The gear 13 which is turned when the range rate is set up by the handle 12 is carried by a shaft 50 which, through bevel gears, actuates a gear 51. This gear meshes with a toothed sector 52 which is pivoted at 53. When the range rate is zero the sector 52 is in its middle position but when a decreasing or increasing range rate is set up by the handle 12, it is moved to the left or right. In the drawing an increasing range rate has been set up upon the device. Furthermore, since the sector is geared to the handle 12, its angular displacement is proportional to the range rate.

This sector 52, is provided with a slot 53' which extends substantially the entire length of the arm of the sector. Riding in the slot 53' is a pin 54 carried by a sliding block 55. This sliding block rides in a slot 56 provided in a link 57. The sliding block 55 is carried by a screw-shaft 58, which has its ends journaled in the link 57 and is rotated by means of a gear 59 in mesh with a gear 60. The gear 60 is driven by a shaft 61 which is provided with universal couplings at its ends connecting it with the gear 60 at one end and a shaft 62 at the other end, upon which a bevel gear 38 is loosely mounted. The gear 38 is connected to the gear 34 which unites with gears 32, 33 and 35 to form a differential. The center gears, 32 and 33 of the differential are carried by a spider 36 which is fastened to the shaft 62. The actuation of the shaft 24 will therefore displace the sliding block 55 an amount which is proportional to the present range or the range indicated by the counter 1. For the accuracy required in gun control the time of flight may be assumed to be proportional to the range. The displacement of the sliding block 55 can therefore be regarded as proportional to the time of flight and this factor is introduced automatically into the predictor in this manner.

The transmission interval also affects the position of the sliding block 55, the block being driven through the gear 38 as before described by means of a handle 65 mounted upon a shaft 68 which carries a worm 67 which actuates a transmission interval dial 68'. This dial is graduated in seconds and constructed to allow for a transmission interval varying from zero to 30 seconds. The shaft 68 also carries a bevel gear 67" meshing with a bevel gear 68" which is connected to the gear 35 of the differential gear 38. The rotation of the gear 68" will rotate the center of the differential and hence move the block 55 proportional to the transmission interval. This total displacement of the block 55 is therefore proportional to the sum of the time of flight interval and the transmission interval.

The link 57 is connected at one end to a link 70 and at the other to a second sector 71 which is pivoted at 72, the link being pivoted to the parallels 70 and 71 at the points 72' and 73 respectively. The sector 71 meshes with a gear 74, which through bevel gears, actuates a shaft 75 which is connected to the spider carrying the gears 44 and 45 of the differential of the advance range counter. The rotation of the center of the differential by the shaft 75 will therefore cause rotation of the gear 47 which will actuate the advance range counter to increase or decrease its range reading, in accordance with the prediction as will now be described.

As before stated, the sector 52 is movable proportional to the range rate. The slot 53' in this sector is so designed that when the pin 54 is at the lower end of the slot, the sector 71 will have no movement which will correspond to a zero time interval and the readings of both range counters will be the same. When the pin 54 is at the upper end of the slot 53' the movement of the sector 71 is such that it will actuate the range counter 2 an amount equal to the change in range which occurs during a time interval of one minute, as for example, if a range rate of eight knots per hour were set up upon the instrument (as shown), the gear ratios actuating the shaft 75 are such that the advance range counter would be moved to change its reading by 270 yards. When the sliding pin occupies any other position in the slot, the movement of the sector 71 is proportional to the range rate for one second multiplied by the number of seconds in the time interval. As shown in the drawing, an increasing range rate of eight knots, a transmission interval of fifteen seconds and a range of 12650 yards which corresponds approximately to a time of flight of about fifteen seconds, have been set up on the instrument. The position of the pin, will therefore correspond approximately to a time interval of 30 seconds and the sector 71 will then be moved one-half as far as where the pin occupies the uppermost position in the slot, so that the advance range counter reads 135 yards above the reading on the present range counter.

It is obvious that this prediction device may be utilized either for predicting the advance range due to the transmission interval alone or for predicting the advance range due to the time of flight alone, since in either instance it would be only necessary to displace the pin 54 proportional to one of these factors.

Other embodiments of the invention will be apparent to one skilled in the art when it is desired to use variables other than range and time and it is therefore not intended to be limited to the specific embodiment shown but only by the scope of the claims appended hereto.

I claim:

1. In an instrument of the class described, means for setting up the rate existing between two variables including a part whose displacement is proportional to the rate, means for setting up a determined value of one of the variables including a part connected to said first named part and having a displacement proportional to the value set up, and a member connected to said second named part and having a displacement proportional to the product of the displacements of said parts.

2. In an instrument of the class described, means for setting up the different values of a rate existing between two variables, means connected to said first named means for setting up different values of one of said variables and means connected to said second means for multiplying the two values set up to determine the value of the other variable.

3. In an instrument of the class described, means for setting up any given range rate, means for setting up any given time interval and means for multiplying the values of the range rate and time interval set up.

4. In an instrument of the class described, a part having a displacement proportional to the range rate, a part having a displacement proportional to a time interval and a member connected to said parts, having a displacement proportional to the product of the displacements of said parts.

5. In an instrument of the class described, a part having a displacement proportional to a given range rate, a part connected to said first named part and having a displacement proportional to a given range and a member connected to said second named part and having a displacement proportional to the product of the displacements of said parts.

6. In an instrument of the class described, a part having a displacement proportional to a range rate, a part having a displacement proportional to the transmission interval required to fire a gun and a member actuated jointly by said parts having a displacement proportional to their product.

7. In an instrument of the class described, a part having a displacement proportional to the range rate, a part having a displacement substantially proportional to a time interval made up of the time of flight interval and the transmission interval, and a member actuated jointly by said parts and having a displacement proportional to their product.

8. In an instrument of the class described, a part having a displacement proportional to the range rate, a part mechanically connected to said first named part and having a displacement substantially proportional to the time of flight of a projectile, and a member actuated by said second named part and having a displacement proportional to the product of said displacement.

9. In an instrument of the class described, a range indicator, means for actuating said indicator to set an initial range thereon, means for setting up a range rate, means for driving said range indicator at a speed proportional to the range rate, means for predicting the change of range occurring during a given time interval and means for actuating said range indicator to change its reading in accordance with the predicted change.

10. In an instrument of the class described, a range indicator, means for setting up an initial range upon said indicator, means for continuously varying said initial reading including a device for setting up a range rate, means associated with said range rate device for predicting the change of range in a determined time interval and means for actuating said range indicator to change its reading in accordance with the predicted change in range.

11. In an instrument of the class described, a range indicator, means for setting up an initial range on said indicator, means for continually varying the initial range reading including a device for setting up a range rate, a part actuated by said range rate device having a displacement proportional to the range rate, a part associated with the first named part and adapted to be displaced proportional to the range, a member actuated by said parts having a displacement proportional to the product of the displacement of said parts and connections from said last named part to the indicator.

12. In an instrument of the class described, a range indicator, a variable speed mechanism for driving said indicator having a differential included in its connection, means for setting up a range rate on said variable speed mechanism, a prediction device having parts thereof displaced proportional to the range and the range rate respectively and connections from said prediction device to said differential.

13. In an instrument of the class described, a range indicator, a variable speed mechanism for driving said indicator, means for setting up an initial range on said indicator, means for driving the variable speed mechanism at speeds proportional to different range rates, a prediction device for determining the change in range occurring during a given time interval and connections from said prediction device to said indicator.

14. In an instrument of the class described a swinging member having an angular displacement proportional to the rate existing between two variables, a part carried by said swinging member having a displacement along said member proportional to the value of one of the variables, and a member connected to said last named part having a displacement proportional to the product of the displacements of said parts.

15. In an instrument of the class described, a swinging member having an annular displacement proportional to the rate existing between two variables, means for displacing said member in accordance with different rates, a part carried by said swinging member having a displacement proportional to the value of one of the variables, means for displacing said part for different values of said variable and a part connected to said last named part having a displacement proportional to the product of the displacements of said swinging member and first named part.

16. In an instrument of the class described, a swinging member having an angular displacement proportional to a range rate, a part carried by said swinging member having a displacement proportional to a time interval and a part connected to said first named part having a displacement proportional to the product of the displacements of said swinging member and first named part.

17. In an instrument of the class described, a swinging member having an angular displacement proportional to the range rate, a part slidably mounted on said swinging member having a displacement proportional to a time interval, and parallelling linkage connected to said part.

18. In an instrument of the class described, a swinging sector, a part slidably mounted in said swinging sector, a link, a travelling nut and screw shaft carried by said link, a pair of parallels connected to the ends of said link, a relatively fixed member for rotating said shaft and a flexible connection between said fixed member and said shaft.

19. In an instrument of the class described, a part having a movement proportional to a rate of movement existing between two objects one at least of which is moving, a part mechanically connected to said first named part and having a displacement proportional to a time interval and a prediction device connected to said second named part for determining the relative displacement of said objects during the said time interval.

20. In an ordnance calculator, a rate of change indicator showing the change in a function of the target, a range indicator, automatic means for indicating a time function of the range and means for combining a function of the range with the rate of change whereby the value of the first named function may be predicted at the time the shell hits the target.

21. In an ordnance calculator, a rate of change indicator showing the change in a function of the target, a range indicator, mechanical means for computing the time of flight from said range, and means for combining said rate of change and said time.

22. In an ordnance calculator, an element adapted to be positioned in accordance with the rate of change of range of a target, a member adapted to be positioned in accordance with the range of the target, computing means actuated by said member to an extent proportional to the time of flight of a shell to the target at the range for which said member is set, mechanism connected to said computing means for adding a time correction thereto and means connected to said element and computing means for indicating future ranges.

23. In an instrument of the class described, a member having a displacement proportional to a range rate, a part carried by said member having a displacement proportional to a time interval and a part connected to said first named part having a displacement proportional to the product of the displacements of said member and first named part.

24. In an ordnance calculator, a rate of change indicator showing the change in a function of the target, a range indicator, automatic means for indicating a time function of the range and means for combining a function of the range with the rate of change whereby the value of the first named function may be predicted.

HANNIBAL C. FORD.